(12) United States Patent
Iida et al.

(10) Patent No.: US 6,527,523 B1
(45) Date of Patent: Mar. 4, 2003

(54) HERMETIC TYPE COMPRESSOR

(75) Inventors: Noboru Iida, Shiga (JP); Kiyoshi Sawai, Shiga (JP)

(73) Assignee: Matsushita Electric Industrial Co., Ltd., Kadoma (JP)

(*) Notice: Subject to any disclaimer, the term of this patent is extended or adjusted under 35 U.S.C. 154(b) by 0 days.

(21) Appl. No.: 09/558,160

(22) Filed: Apr. 26, 2000

(30) Foreign Application Priority Data

Apr. 28, 1999 (JP) ............................................. 11-120894

(51) Int. Cl.⁷ ................................................. F04B 17/03
(52) U.S. Cl. ........................... 417/410.3; 417/423.7; 417/424.1; 417/902
(58) Field of Search ........................ 310/156.53, 156.56; 417/410.3, 423.7, 424.1, 424.2, 902; 418/88, 94

(56) References Cited

U.S. PATENT DOCUMENTS

| 2,091,752 A | * | 8/1937 | Davis ........................ 417/410.3 |
| 5,104,297 A | * | 4/1992 | Sekiguchi et al. ........ 417/410.3 |
| 5,314,318 A | * | 5/1994 | Hata et al. ..................... 418/88 |
| 5,597,293 A | * | 1/1997 | Bushnell et al. ......... 417/410.3 |
| 5,666,015 A | * | 9/1997 | Uchibori et al. ......... 310/156.53 |
| 5,820,357 A | * | 10/1998 | Itoh .......................... 417/410.3 |
| 5,842,846 A | * | 12/1998 | Fukuoka et al. .............. 418/88 |
| 6,135,738 A | * | 10/2000 | Kajiwara et al. .............. 418/88 |

FOREIGN PATENT DOCUMENTS

| JP | 54-43305 | * | 4/1979 | ................ 417/410.3 |
| JP | 4-164184 | * | 6/1992 | ................ 417/410.3 |
| JP | 5-288185 | * | 11/1993 | ................ 417/410.3 |

* cited by examiner

*Primary Examiner*—Michael Koczo
(74) *Attorney, Agent, or Firm*—Armstrong, Westerman & Hattori, LLP

(57) ABSTRACT

A hermetic type compressor comprises a hermetic container in which a compressor mechanism and a motor are provided, and a rotor of the motor is comprised of laminated iron plates in which permanent magnets are embedded, and a main shaft of the compressor mechanism is inserted into the rotor over its entire length. With this structure, even if a centrifugal force is applied to a balance weight at the high speed operation, laminated iron plates of a rotor are not displaced in the radial direction, and an excellent driving state can be kept.

4 Claims, 2 Drawing Sheets

HERMETIC TYPE COMPRESSOR

BACKGROUND OF THE INVENTION (1) Field of the Invention

The present invention relates to a hermetic type compressor mainly used in an air conditioner.

(2) Description of the Prior Art

In a conventional hermetic type compressor, especially one-cylinder type rotary compressor, an induction motor is employed in many cases. A rotor of the motor is made of iron plates firmed with aluminum; therefore, even though the rotor is hollow, a portion of the rotor is not displaced.

Accordingly, in the case of the conventional hermetic type compressor, its main shaft is made short and a portion of the rotor is made hollow in many cases.

However, recently, in order to realize a high efficiency motor, the rotor of the motor is made of laminated iron plates and permanent magnets are embedded inside thereof. In this rotor, embedded pins are caulked from opposite end surfaces, thereby holding the laminated iron plates.

In the case of a motor whose rotor is made of laminated iron plates in this manner and a portion thereof is hollow, when a force such as a centrifugal force acting on a balance weight is applied to the laminated iron plates, a portion of the laminated iron plates is displaced in the radial direction in some cases. If the laminated iron plates are displaced in the radial direction, the rotor comes into contact with a stator, thereby causing problems such as increase of sliding loss, the resultant input increase, and damages to a compressor mechanism caused by the particles produced by such contact.

Further, refrigerant gas compressed in the hermetic type compressor is discharged into an internal space of a hermetic container from a discharge portion of the compressor mechanism (e.g., a discharge hole of an upper bearing) and then, the refrigerant gas passes through a clearance between the stator and the rotor and a clearance between the inner wall of hermetic container and the stator, and is discharged into a refrigeration cycle from a discharge pipe through the space above the motor. A large amount of lubricant oil is included in the refrigerant gas discharged from the compressor mechanism, and if the oil is circulated through the refrigeration cycle together with the refrigerant gas, efficiency of the refrigeration cycle (coefficient of performance) is decreased. In the case of the room air conditioner, if the amount of lubricant oil exceeds 0.1 5 wt % (weight percentage) of the circulating amount of refrigerant, the performance of refrigeration cycle is deteriorated. Therefore, it is necessary to separate the oil within the hermetic container before the refrigerant gas is discharged from the discharge pipe. To achieve this objective, i.e., to separate the oil from the refrigerant gas, the conventional hermetic type compressors employ a disk mounted to an upper portion of the rotor that shakes off oil mist by a centrifugal force, or a large volume upper space above the motor to reduce the speed of gas flow, thereby separating the oil.

Thereupon, it is an object of the present invention to provide a hermetic type compressor in which even if a centrifugal force is applied to a balance weight at the time of high speed operation, laminated iron plates of a rotor are not displaced in the radical direction, and an excellent driving state can be kept.

It is another object of the invention to provide a hermetic type compressor in which a stirring effect of a rotor does not exert an influence upon an upper space above the motor, thereby, the amount of oil discharged from a discharge pipe is reduced, and the entire height of the hermetic type compressor can easily be accomodated in, for example, an air conditioner.

DISCLOSURE OF THE INVENTION

According to a first aspect of the present invention, there is provided a hermetic type compressor comprising a hermetic container in which a compressor mechanism and a motor are accomodated, and a rotor of the motor is comprised of laminated iron plates in which permanent magnets are embedded, and a main shaft of the compressor mechanism is inserted into the rotor over its entire length as a common shaft thereof.

According to this first aspect, since the main shaft of the compressor mechanism is inserted into the rotor over its entire length as its common shaft, even if a centrifugal force is applied to a balance weight at the high speed operation, the laminated iron plates of rotor are not displaced in the radical direction, and, therefore, an excellent driving state can be kept.

According to a second aspect of the present invention, in the above hermetic type compressor of the first aspect, large and small balance weights are mounted to opposite end surfaces of the rotor, respectively.

If the balance weights are provided as in the second aspect, even if a large centrifugal force is applied to a portion of the laminated iron plates of the rotor, although the laminated iron plates of the rotor are prone to be displaced in the radical direction, such displacement problem can be prevented, and a excellent driving state can be kept.

According to a third aspect, there is provided a hermectic type compressor comprising a hermectic container having an internal space to which a discharge gas pressure applies, a compressor mechanism provided in a lower portion of the hermectic container, a motor provided in an upper portion of the hermectic container, and a discharge pipe provided in the upper portion of the hermectic container, and a cover is mounted to the upper portion of a coil end of a stator of the motor to cover a space above the rotor of the motor.

According to the third aspect, the flow of refrigerant which has passed through a clearance between the rotor and the stator is blocked by the cover and is bent substantially perpendicularly; and the refrigerant passes through the coil end and goes outside of the stator. Therefore, when the refrigerant passes through the coil end, oil adheres to the coil wires and is separated from the refrigerant, and it is possible to prevent the oil from being discharged out from the hermectic container. Further, since space in which the rotor rotates is completely isolated from an upper space of the container by the cover, a stirring effect by the rotor 32 does not exert an influence upon the upper space. Further, since oil mist does not directly reach the discharge pipe, the amount of oil discharging from the discharge pipe is remarkably reduced. Yet further, it is possible to reduce the necessary volume of upper space above the motor by mounting the cover, the entire height of the hermectic type compressor can be shortened, and, thereby, it is possible to provide a hermectic type compressor which can easily be accomodated into, for example, an air conditioner.

DESCRIPTION OF THE PREFERRED EMBODIMENT

Figure 1:
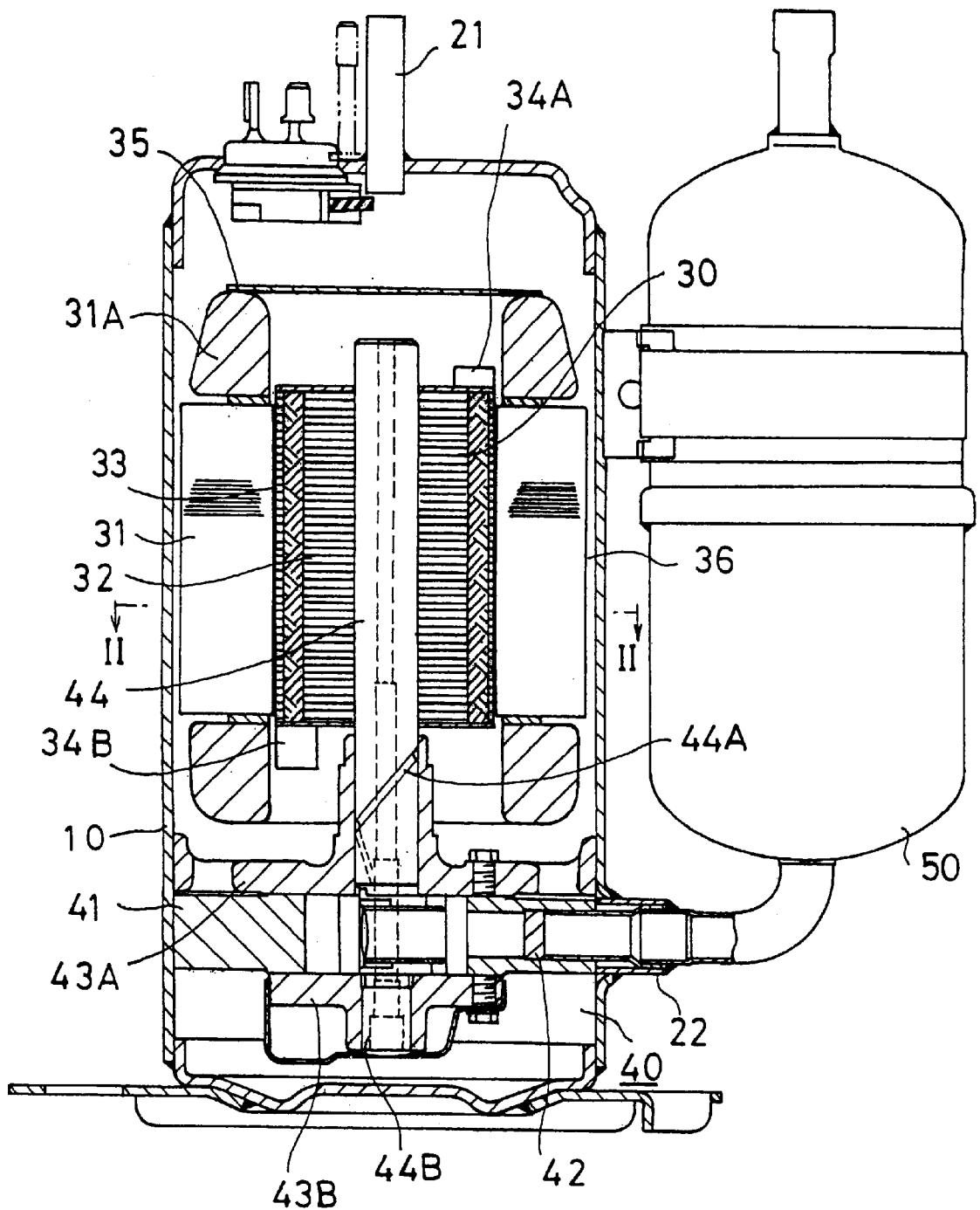
FIG. 1 is a vertical sectional view of a hermetic type compressor according to an embodiment of the present invention.
Figure 2:
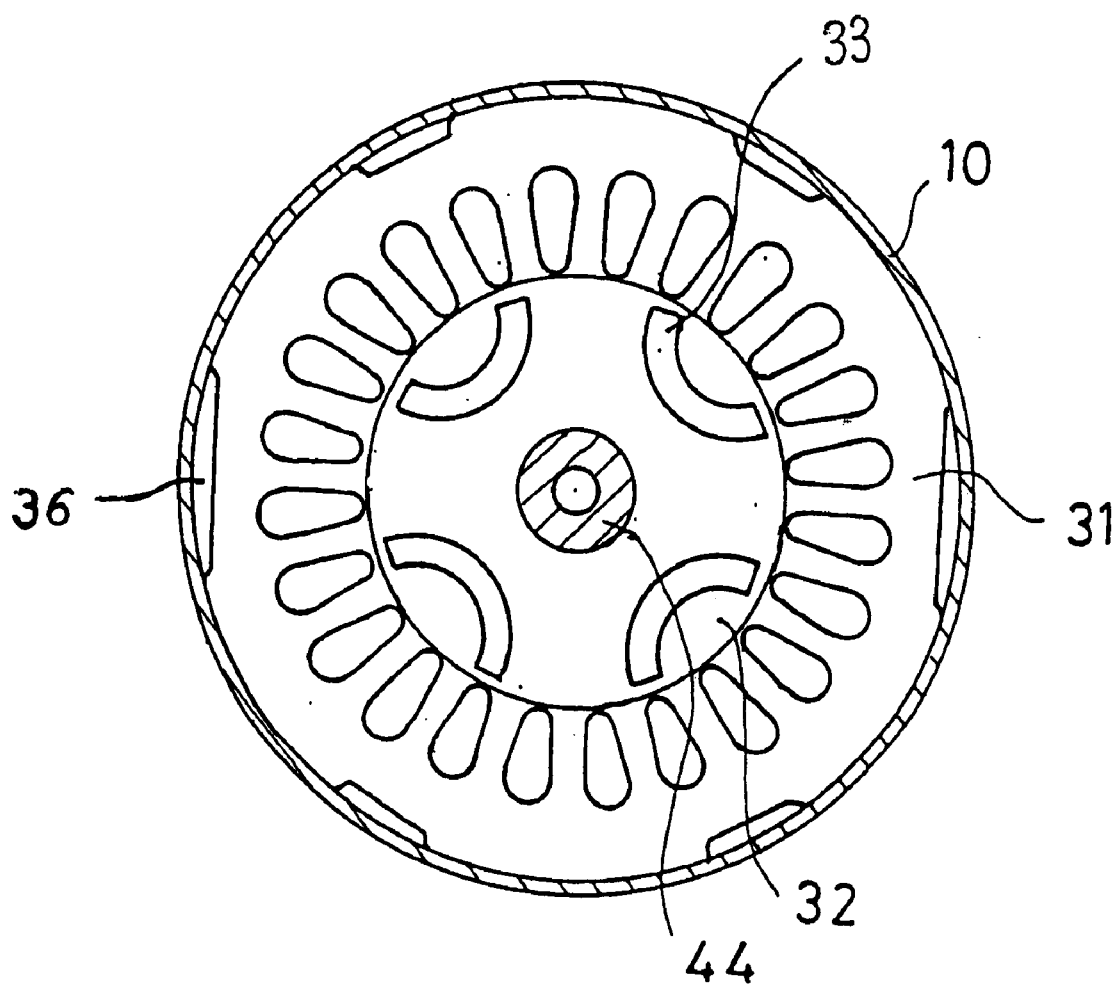
FIG.2 is a sectional view taken along the line II—II in FIG. 1.

A hermetic type compressor according to an embodiment of the present invention will be explained referring to the accompanying drawings.

As shown in the drawings, the hermetic type compressor according to the present embodiment has a hermetic container 10 in which a motor 30 and a compressor mechanism 40 are provided. The motor 30 is disposed in an upper portion of the hermetic container 10, and the compressor mechanism 40 is disposed in a lower portion of the hermetic container 10.

The hermetic container is provided at its upper portion with a discharge pipe 21, and at its lower side surface with an intake pipe 22. The intake pipe 22 is connected to an accumulator 50.

The motor 30 is comprised of a stator 31 fixed to the hermetic container 10, and a rotor 32 which rotates inside the stator 31. Each of the stator 31 and the rotor 32 is comprised of laminated iron plates. Permanent magnets 33 are embedded passing through the laminated iron plates.

Balance weights 34A and 34B are mounted on the opposite end surfaces of the rotor 32. The balance weight 34B mounted on the lower surface of the rotor 32 is larger the balance weight 34A mounted on the upper surface of the rotor 32. A cover 35 is mounted on the upper portion of the upper coil end 31A of the stator 31 so as to cover the upper space above the rotor 32. A passage 36 is provided between the stator 31 and the inner wall of hermetic container 10.

The compressor mechanism 40 is comprised of a cylinder 41 fixed to the hermetic container 10, and a piston 42, which rotates inside the cylinder 41. Upper and lower bearing 43A and 43B are respectively disposed on the upper and lower surfaces of the cylinder 41. A lower portion of a main shaft 44 that drives the piston 42 is rotatably held by the upper and lower bearings 43A and 43B. An upper portion of the main shaft 44 is inserted all the way into the center of the rotor 32 as its shaft. The main shaft 44 is provided with an oil supply passage 44A. The main shaft 44 is provided at its lower end with an oil pump 44B to pump the oil accumulated in the lower portion of the hermectic container 10. The oil supplied from the oil pump 44B is supplied to a sliding portion and the like of the compressor mechanism 40 through the oil supply passage 44A.

A flow of the refrigerant and a flow of the oil in the hermetic type compressor will be explained below.

The refrigerant drawn through the intake pipe 22 by rotation of the piston 42 is introduced into a space in the cylinder 41 which is closed by the upper and lower bearings 43A and 43B, and is compressed. Thereafter, the refrigerant is discharged into the inside of hermetic container 10 from a discharge port provided either one of the upper and lower bearings 43A and 43B.

On the other hand, the oil at the bottom of the hermetic container 10 is introduced into the oil supply passage 44A by the oil pump 44B, and introduced into the inside of cylinder 41 and sliding portions of the upper and lower bearings 43A and 43B. A portion of the oil introduced into the inside cylinder 41 is discharged from the discharge port together with the refrigerant.

The refrigerant discharged from the compressor mechanism 40 passes through a clearance between the rotor 32 and the stator 31 and through the passage 36 provided between the stator 31 and the inner wall of hermetic container 10, and is introduced into the space above the rotor 32. The flow of refrigerant which has passed through the clearance between the rotor 32 and the stator 31 is blocked by the cover 35, is bent substantially perpendicularly, and passes through the coil end 31A to the outside of the stator 31. The oil discharged with the refrigerant from the compressor mechanism 40 adheres to coil wires and, thereby, is separated from the refrigerant. Therefore, it is possible to prevent the oil from being discharged into the outside of the stator with the refrigerant, and being discharged from the discharge pipe 32. Furthermore, since the space in which the rotor 32 rotates is completely isolated from the upper space above the motor by the cover 35, a stirring effect caused by the rotor 32 does not exert an influence upon the upper space above the motor 30; oil mist does not directly reach the discharge pipe 21; and therefore, the amount of oil being discharged from the discharge pipe 21 is remarkably reduced. Furthermore, mounting the cover 35 makes it possible to reduce the volume of the upper space above the motor 30; and therefore, the entire height of the hermetic type compressor can be shortened.

Although it is not illustrated in the drawings, the refrigerant discharged from the discharge pipe 21 is returned to the accumulator 50 through a condenser, a decompressor and an evaporator in this order, and drawn into the cylinder 41 from the intake pipe 22.

According to an experiment, in a hermetic type compressor having the oil discharge amount of 0.15 wt % at the time of warming operation at its rating (2.8 kw), the discharged amount of oil was reduced to 0.07 wt % by mounting the cover 35.

The effect applied to the rotor 32 of the main shaft 44 will be explained next.

The rotor 32 comprises the laminated iron plates. The balance weights 34A and 34B are mounted on the upper and lower end surfaces of the rotor 32. The balance weight 34B mounted on the lower surface of the rotor 32 is larger the balance weight 34A mounted on the upper surface of the rotor 32. Therefore, when the rotor 32 rotates, a great centrifugal force is applied to the laminated iron plates closer to the upper and lower end surfaces on which the balance weights 34A and 34B are mounted, and this centrifugal force is greater than that applied to the remaining laminated iron plates. The difference between these centrifugal forces is further increased as the rotation speed increases, and the laminated iron plates are prone to be displaced. However, by providing the main shaft 44 over the entire length of the rotor 32 as in the present embodiment, it is possible to reliably prevent the laminated iron plates from being displaced in the radial direction.

Although the balance weights are mounted to the upper and lower opposite end surfaces of the rotor in the present embodiment, higher effect over conventional motor can be obtained by providing the balance weight on the upper end surface of the rotor.

Further, although the rotary type compressor is used in the present embodiment, it should be apparent to the person in this field that the same effect can be obtained if a scroll type compressor is used.

As described above, according to the present invention, even if a centrifugal force is applied to a balance weight at the high speed operation, laminated iron plates of a rotor are not displaced in the radial direction, and an excellent driving state can be kept.

It is possible to provide a hermetic type compressor in which a stirring effect by a rotor does not exert an influence upon an upper space above the motor; the amount of oil discharged from a discharge pipe is reduced; and the entire height of the hermetic type compressor can be shortened so that the compressor can easily be accommodated.

What is claimed is:

1. A hermetic type compressor comprising:

a hermetic container having an internal space to which a discharge gas pressure applies;

a compressor mechanism provided in the lower portion of said hermetic container;

a motor provided in the upper portion of said hermetic container;

a discharge pipe provided in the upper portion of said hermetic container;

a cover mounted to the upper portion of a coil end of a stator of said motor for covering and isolating a space above a rotor of said motor;

a rotor of said motor comprising laminated iron plates in which permanent magnets are embedded;

a shaft of said compressor mechanism inserted into said rotor over its entire length as a common shaft of said rotor; and an oil pump provided at an end of said shaft, said shaft being provided with an oil supply passage for supplying oil to a sliding portion of the compressor mechanism, wherein the space above the rotor and an external space of the stator are separated by the cover.

2. A hermetic type compressor of claim 1, wherein a balance weight is mounted to at least one end surface of said rotor.

3. A hermetic type compressor of claim 1, wherein, balance weights are mounted to the upper surface and the lower surface of said rotor, respectively.

4. A hermetic type compressor of claim 3, wherein, said balance weight mounted to the lower surface of said rotor has a greater weight than said balance weight mounted to the upper surface.

* * * * *